United States Patent [19]

Miyawaki

[11] Patent Number: 4,659,321

[45] Date of Patent: Apr. 21, 1987

[54] SYSTEM FOR CONTROLLING THE TRANSMISSION RATIO OF AN INFINITELY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 675,583

[22] Filed: Nov. 28, 1984

[30] Foreign Application Priority Data

Nov. 30, 1983 [JP] Japan ................. 58-226619

[51] Int. Cl.[4] .......................................... F16H 11/04
[52] U.S. Cl. ......................................... 474/28; 74/867
[58] Field of Search .................... 474/28; 74/867, 865, 74/868

[56] References Cited

U.S. PATENT DOCUMENTS 4,419,910 12/1983 Miki et al. .......................... 74/867

FOREIGN PATENT DOCUMENTS 11342 5/1980 European Pat. Off. .

Primary Examiner—James A. Leppink
Assistant Examiner—Thuy M. Bui
Attorney, Agent, or Firm—Martin A. Farber

[57] ABSTRACT

A system for an infinitely variable transmission having a primary pulley having a hydraulically shiftable disc and a hydraulic cylinder for shifting the disc, a secondary pulley having a hydraulically shiftable disc and a hydraulic cylinder for operating the disc, a belt engaged with both pulleys. A hydraulic circuit has a transmission ratio control valve comprising a spool for selectively shifting the disc of the primary pulley in the downshift direction and upshift direction, and a pressure regulator valve for regulating the oil pressure is operatively connected to the hydraulically shiftable disc to detect transmission ratio during operation. A shifting device is provided for shifting the spool of the transmission ratio control valve in the upshift and downshift direction in dependency on throttle position. A throttle switch is provided to be closed when a throttle valve of the vehicle is widely opened for producing a signal, and a solenoid operated valve responds to the signal and a downshift valve operated in dependence on the operation of the solenoid operated valve so as to forceably shift the spool of the transmission ratio control valve in the downshift direction from a position of said spool determined by the shifting means so as to downshift the transmission.

10 Claims, 5 Drawing Figures

SYSTEM FOR CONTROLLING THE TRANSMISSION RATIO OF AN INFINITELY VARIABLE TRANSMISSION

BACKGROUND OF THE INVENTION

The present invention relates to a system for controlling the transmission ratio of an infinitely variable transmission for a vehicle, and more particularly to a system for downshifting the transmission.

European Patent Publication No. 0011342 discloses a control system for an infinitely variable transmission. The transmission comprises an endless belt running over a primary and a secondary pulley, each pulley being so designed that the running diameter of the driving belt on the pulley varies in dependency on driving conditions. In the system, a transmission ratio control valve is provided so as to change the transmission ratio in dependency on driving conditions of a vehicle. The control valve comprises a spool biased in one direction by a spring which is compressed by a shift cam rotated in dependency on the depression of an accelerator pedal and biased in the opposite direction by Pitot pressure dependent on the speed of the primary pulley, that is engine speed. The spring biases the spool in the direction which results in downshifting and the Pitot pressure urges the spool in the upshift direction. Thus, during starting of the vehicle, when an accelerator pedal is depressed, the spool is shifted in the downshift direction to provide the acceleration of the vehicle. If the accelerator pedal is greatly pushed down (kickdown) during the driving of the vehicle, the transmission is shifted down to effect an acceleration characteristic. The acceleration characteristic depends on the magnitude of depression of the accelerator pedal and on the shape of the shift cam. It is difficult to make a profile of a shift cam which provides a sufficient acceleration characteristic at every speed of the vehicle, and hence there is a speed range in which the vehicle can not be desirably accelerated.

On the other hand, an infinitely variable transmission connected with an engine through an electromagnetic clutch has been proposed. In such a system, the electromagnetic clutch disengages when the vehicle speed decreases below a predetermined low speed. If the engine is accelerated during such low speed coasting in order to re-drive the vehicle, the engine speed rapidly increases to a high speed because of very light load due to disengagement of the clutch. When the engine speed exceeds a predetermined speed, the clutch engages. At that time the drive shaft of the clutch is rotated at a high speed by the engine, and on the contrary the driven shaft (that is the primary pulley) is rotated at a low speed by wheels of the vehicle through a power transmitting system. Accordingly, when the clutch engages under a condition of a great difference between the speeds of drive and driven shafts, the clutch produces shock or greatly slips, which decreases the acceleration characteristic.

SUMMARY OF THE INVENTION

An object of the present invention is to eliminate the above described disadvantages of the prior art.

According to the present invention, there is provided a system for controlling the transmission ratio of an infinitely variable transmission having a primary pulley having a hydraulically shiftable disc and a hydraulic cylinder for shifting the disc, a secondary pulley having a hydraulically shiftable disc and a hydraulic cylinder for operating the disc, a belt engaged with both pulleys, a hydraulic circuit having a transmission ration control valve comprising a spool for shifting the disc of the primary pulley in the downshift direction and upshift direction, and shifting means for operating the transmission ratio control valve in dependency on throttle position, the system comprising first means for detecting a wide open throttle position and for producing a signal, and second means responsive to said signal for forcibly shifting said spool in the downshift direction from a position of said spool determined by the shifting means so as to downshift the transmission.

The present invention will be more apparent by way of example from the following description of embodiments of a control system in accordance therewith, reference being made to the accompanying drawings.

DETAILED DESCRIPTION OF THE PREFERRED EMBODIMENTS

Figure 1:
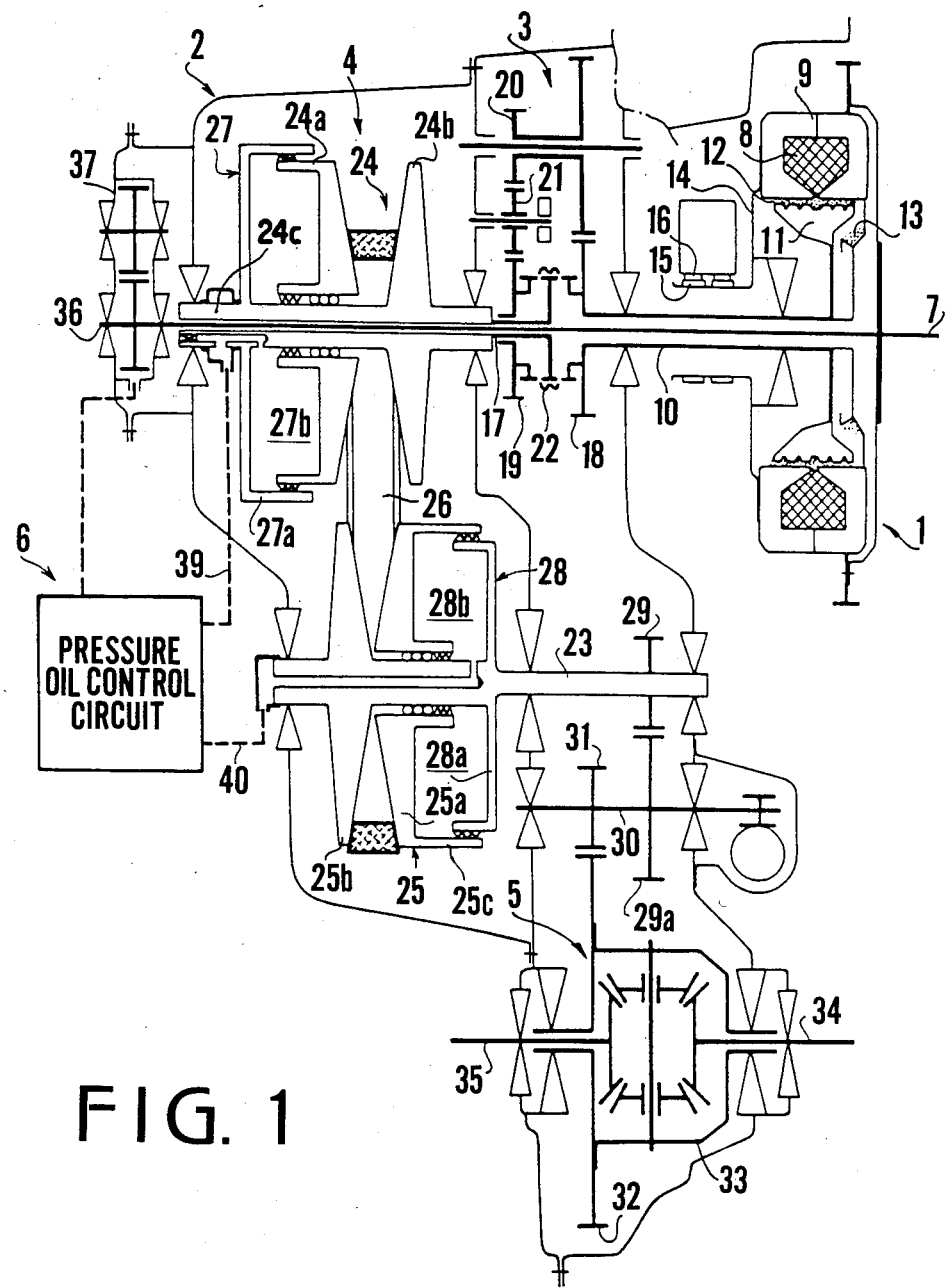
FIG. 1 is a schematic illustration of an infinitely variable belt-drive transmission.

The infinitely variable belt-drive automatic transmission for a vehicle to which the present invention is applied, comprises, as shown in FIG. 1, an electromagnetic powder clutch 1, an infinitely variable belt-drive transmission 2, a reversing mechanism 3, pulleys and belt device 4, final reduction device 5, and a pressure oil control circuit 6 which are operatively connected as follows. The crankshaft 7 of an engine (not shown) is connected to an annular drive member 9 of the electromagnetic powder clutch 1. The electromagnetic powder clutch comprises a coil 8 provided in the drive member 9, a driven member 11 having its outer periphery spaced from the inner periphery of the drive member 9 by a gap 12, and a powder chamber 13 defined between the drive member 9 and the driven member 11. The powder chamber 13 is filled with magnetic powder material. The driven member 11 is secured to an input shaft 10 of the belt-drive transmission 2. A holder 14 secured to the drive member 9 carries slip rings 15 which are electrically connected to the coil 8. The coil 8 is supplied through brushes 16 and the slip rings 15 with control current from a control circuit.

When the magnetizing coil 8 is excited by clutch current, drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the infinitely variable transmission 2, the reversing mechanism 3 is provided between the input shaft 10 and a main shaft 17 of the infinitely variable transmission 2. The main shaft 17 is cylindrical and is disposed coaxially to the input shaft 10. The reversing mechanism 3 comprises a drive gear 18 integral with the input shaft 10 and a driven gear 19 rotatably mounted on the main shaft 17 for reverse drive. Gear 18 is engaged with gear 19 through a counter gear 20 and an idler gear 21. An axially movable dog clutch 22 is splined on the main shaft 17; by shifting the dog clutch 22 from the neutral position (P (parking) or N (neutral) range) shown and engaging it with gear 18, the main shaft 17 is coupled directly with the input shaft 10 to establish forward drive in the D (drive) range or L (low) range, while by shifting the clutch 22 in the opposite direction and engaging it with gear 19, the direction of rotation of the main shaft 17 is reversed by the gears 18 to 21 to establish reverse driving (R range).

Main shaft 17 has an axial passage in which these is mounted an oil pump driving shaft 36 connected to the crankshaft 7. An axially fixed conical disc 24b is secured to the main shaft 17 and an axially movable conical disc 24a is axially slidably mounted on a shaft portion 24c of the disc 24b on the main shaft 17; the discs 24a and 24b together form a primary pulley 24. The movable conical disc 24a also slides in a cylinder 27a secured to the main shaft 17 or the shaft portion 24c to form therewith a cylinder chamber 27b acting as a pressure oil servo device 27, with the movable conical disc 24a acting as a piston in the cylinder chamber 27b. Chamber 27b communicates with a gear pump 37 through a passage 39 and the pressure oil control circuit 6. The gear pump 37 is driven by the shaft 36.

An output shaft 23 is disposed in parallel with the main shaft 17. A fixed conical disc 25b is formed on the output shaft 23 opposite the movable disc 24a and a movable conical disc 25a is slidably mounted on the shaft 23 opposite the disc 24b. Movable conical disc 25a has a cylindrical portion 25c in which a piston 28a of a pressure oil servo device 28 secured to the output shaft 23 is slidably engaged. The discs 25a and 25b form a secondary pulley 25. A chamber 28b defined by the movable conical disc 25a and the piston 28a is communicated with the gear pump 37 through a passage 40 and the pressure oil control circuit 6. A drive belt 26 engages with the primary pulley 24 and the secondary pulley 25.

Secured to the output shaft 23 is a drive gear 29 which engages with a gear 29a on an intermediate shaft 30. An output gear 31 secured to shaft 30 engages with a final gear 32. Rotation of the final gear 32 is transmitted to axles 34 and 35 of the vehicle driving its wheels through a differential 33.

Figure 2:
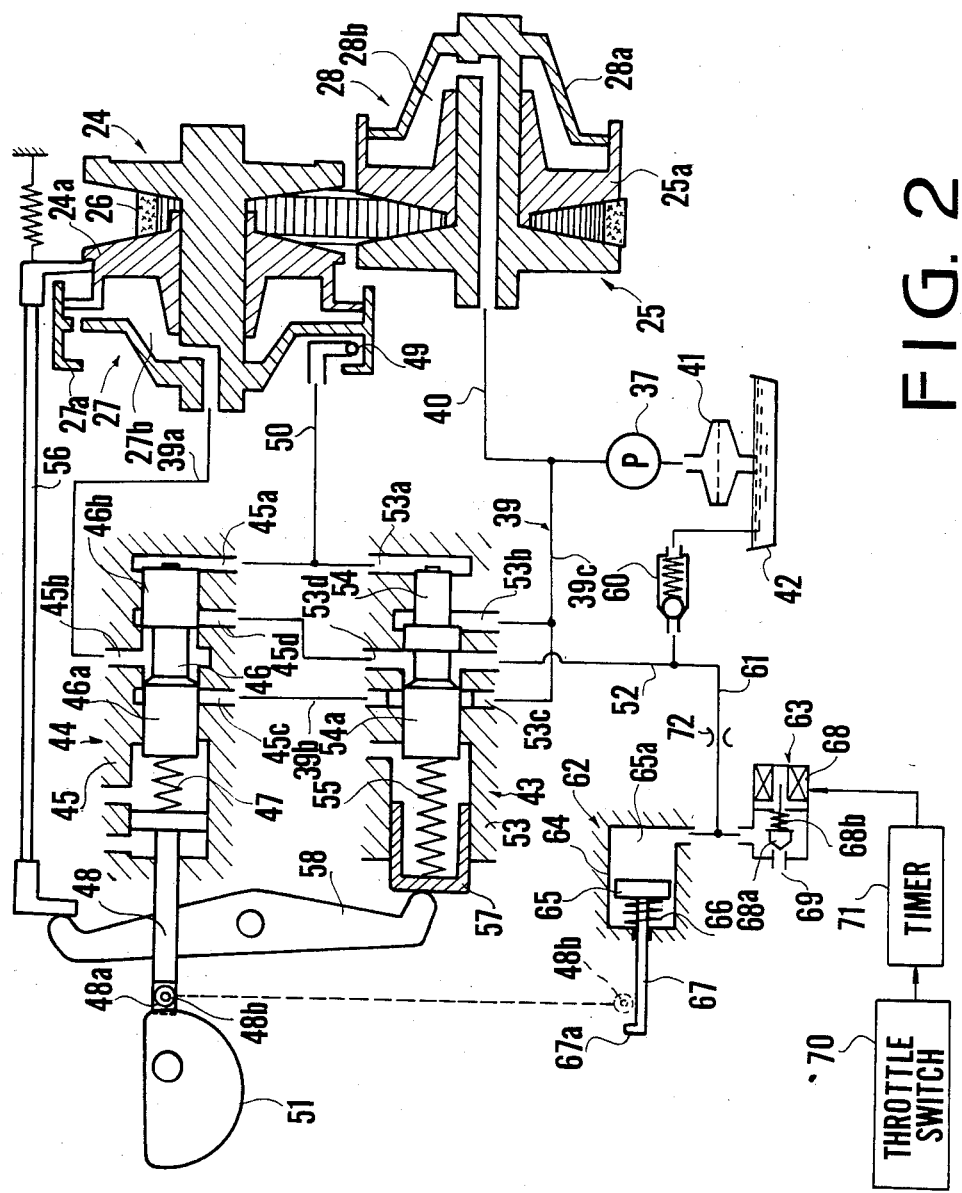
FIG. 2 is a schematic diagram showing a control system of the transmission according to the present invention.

Referring to FIG. 2, the chamber 27b of servo device 27 is applied with pressure oil by the gear pump 37 from an oil reservoir 42 passing through a filter 41, conduit 39, pressure regulator valve 43 and the transmission ratio control valve 44, and chamber 28b of servo device 28 is applied with pressure oil through a circuit 40 without passing through the valves 43 and 44. The movable conical disc 24a is so designed that pressure the receiving area thereof is larger than that of the movable conical disc 25a.

The transmission ratio control valve 44 comprises a valve body 45, spool 46, a compression spring 47 for biasing the spool in the downshift direction, and an actuating member 48 for changing the action of the spring 47. A Pitot tube 49 is provided in an annular chamber of the cylinder 27a in order to detect the engine speed. The Pitot pressure is applied to the right end of the spool 46 through a conduit 50 and port 45a to urge the spool in the upshift direction. The actuating member 48 has a roller 48a as a cam follower which engages a shift cam 51. The shift cam 51 is operatively connected to an accelerator pedal (not shown) of the vehicle so as to be rotated in dependency on the magnitude of depression of the pedal. A port 45b of the valve 44 is selectively communicated with a pressure oil supply port 45c or a drain port 45d in accordance with the position of lands 46a and 46b of the spool 46. Port 45b communicates with chamber 27b through a conduit 39a, the port 45c communicates with the pressure regulator valve 43 through a conduit 39b, and the drain port 45d communicates with the oil reservoir 42 through a port 53d, conduit 52 and check valve 60.

The pressure regulator valve 43 comprises a valve body 53, spool 54, and a spring 55 for biasing the spool 54 in one direction. The right end of the spool 54 opposite the spring 55 is applied with Pitot pressure through the conduit 50 and port 53a, and further the spool 54 is applied with pressure of the pressure oil supplied through conduit 39c and port 53b. One end of the spring 55 engages with a slidable cylinder 57 which is moved through an arm 58 and rod 56. The rod 56 engages the disc 24a for detecting transmission ratio during operation. A port 53c is selectively communicated with a conduit 39b or a port 53d in accordance with the position of a land 54a of the spool 54.

Describing the operation of the valve system, when Pitot pressure and/or pressure of pressure oil is higher than the compression of the spring 55, the spool 54 is shifted to the left, so that port 53c communicates with drain port 53d. Thus, the pressure of pressure oil decreases in dependency on the position of the spool 54. When the disc 24a moves to the left, which means high transmission ratio, the rod 56 moves to the left to compress the spring 55 by arm 58 and cylinder 57 to increase the compression force. Thus, the pressure of the oil is increased so as to prevent the slipping of the belt at higher transmitting torque.

On the other hand, spool 46 of the transmission ratio control valve 44 is positioned dependent on the Pitot pressure and the compression force of the spring 47. When the accelerator pedal is depressed, the shift cam 51 causes the actuator 48 to move to the right to compress spring 47, which in turn shifts the spool 46 to the right. Thus, chamber 27b of the primary pulley 24 communicates to with the oil reservoir 42 through conduit 39a, ports 45b, 45d, 53d, and conduit 52, so that a high transmission ratio is provided. When engine speed increases and Pitot pressure becomes higher than the high compression force of the spring 47, the spool 46 is moved to the left. Thus, pressure oil is applied to the chamber 27b through conduit 39c, port 53c, conduit 39b, ports 45c and 45b, and conduit 39a, so that disc 24a is shifted to the right. Accordingly, transmission ratio starts to change to a lower transmission ratio.

In accordance with the present invention, a downshift valve 62 and a solenoid operated drain valve 63 are provided. The downshift valve 62 comprises a valve body 64, piston 65, spring 66 and chamber 65a. The piston 65 has an engaging rod 67 having an engaging projection 67a which is adapted to engage with the shaft 48b of the roller 48a. The chamber 65a is communicated with conduit 52 by a conduit 61 having an orifice 72.

The solenoid operated drain valve 63 comprises a solenoid 68, valve 68a and drain port 69 which is normally closed by the valve 68a biased by a spring 68b. The solenoid 68 is electrically connected to a throttle switch 70 through a timer 71. The throttle switch 70 is adapted to close when the accelerator pedal is greatly depressed.

In steady driving conditions, pressure of pressure oil in the conduit 52 causes the piston 65 to shift to the left against the spring 66 so that the projection 67a disengages from the shaft 48b of roller 48a.

Figure 4:
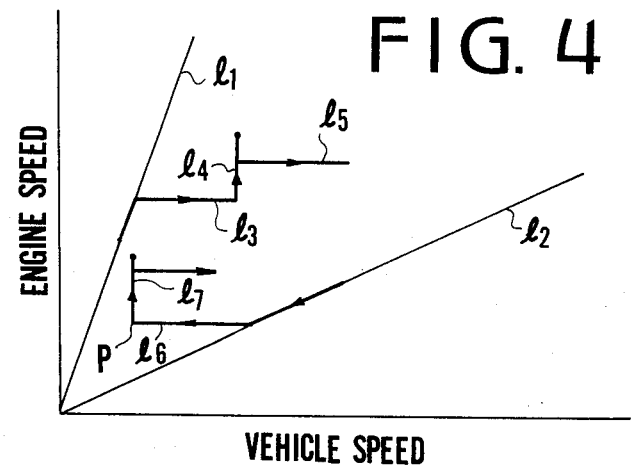
FIG. 4 is a graph showing the relationships between engine speed and vehicle speed of a vehicle with the transmission and control system of FIGS. 1 and 2.

In FIG. 4, line $l_1$ shows a relationship between engine speed and vehicle speed at the highest transmission ratio and line $l_2$ shows a relationship at the lowest transmission ratio. When starting the vehicle, the transmission ratio is at the highest ratio. Accordingly engine and vehicle speeds vary along the line $l_1$. When the spool 46 of transmission ratio control valve 44 is shifted to the left by a high Pitot pressure at a high engine speed, the transmission ratio begins to change to the low transmission ratio. Therefore, engine speed may be held at a constant speed and vehicle speed increases as shown by a line $l_3$. When the accelerator pedal is greatly depressed (wide throttle open) during driving along the line $l_3$, the throttle switch 70 is closed to operate timer 71. The solenoid 68 is excited for a predetermined period of time determined by the timer 71 to open the drain port 69. Consequently, oil in the chamber 65a is discharged through the drain port, so that piston 65 is moved to the right by the spring 66. Accordingly, the projection 67a of the rod 67 engages with the shaft 48b of roller 48a and shifts the roller 48a away from the shift cam 51, and the actuator 48, and the spool 46 to the right. Thus, the transmission ratio is shifted further to a high ratio (downshift) without of the shift cam 51. A line $l_4$ shows the downshift. After the predetermined period by the timer 71, the solenoid 68 is de-energized to close the drain port 69, so that the piston is moved to the left to free the spool 46. The spool is positioned by the shift cam 51 and the transmission ratio changes along a line $l_5$ which is determined by the position of the shift cam 51.

Figure 5:
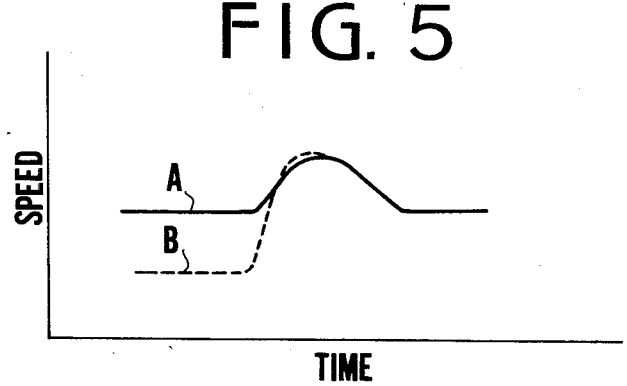
FIG. 5 shows variations of engine speed and primary pulley speed.

When decelerating the vehicle, engine and vehicle speeds decrease along the lowest transmission ratio line $l_2$. When engine and vehicle speeds decrease to a value, the transmission ratio begins to a change to higher ratio. Accordingly, the speeds change along a line $l_6$. When the vehicle speed decreases below a predetermined speed, the electromagnetic powder clutch 1 is adapted to disengage in order to prevent stalling of the engine. After the disengagement of the clutch, when the acceleration pedal is greatly pushed down at a point P, a downshift takes place as shown by a line $l_7$. Since the clutch disengaged, the primary pulley 24 is rotated the driving wheels of the vehicle through a power transmitting system. When the clutch is disengaged, engine speed rapidly increases but the primary pulley is rotated at a low speed. Therefore, there is a large difference between the speeds of the drive and driven shafts of the clutch after the disengagement of the clutch. However, in the system of the present invention, since a large downshift takes place when the acceleration pedal is greatly depressed, the primary pulley 24 is rotated at a high speed. FIG. 5 shows variations of engine speed A and primary pulley speed B which rises approximately to the engine speed at the downshift. Thus, the clutch can smoothly engage.

Figure 3:
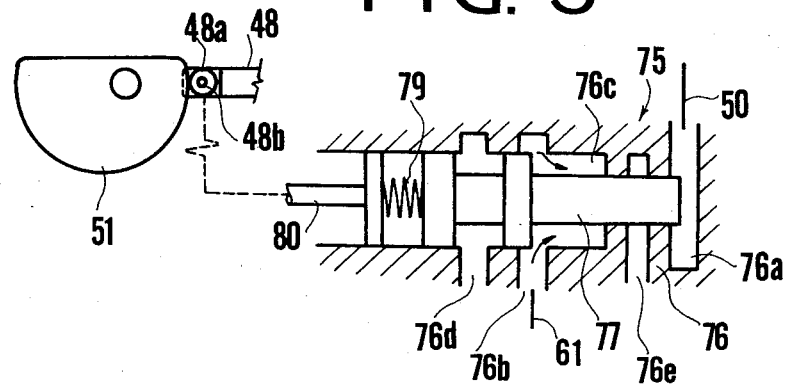
FIG. 3 is a sectional view showing a part of a second embodiment of the present invention.

FIG. 3 shows a main part of another embodiment of the present invention. A drain valve 75 is provided as a substitute for the solenoid operated drain valve 63 in the first embodiment. The drain valve 75 comprises a valve body 76, spool 77, spring 79 biasing the spool 77 in one direction, and actuating member 80 engaged with the roller 48a so as to be shifted by the roller. An end of the spool opposite the spring 79 is applied with Pitot pressure through a port 76a through line 50. Pressure oil in the conduit 61 is selectively fed from a port 76b to a chamber 76c or drain port 76d. A drain port 76e is provided for draining oil leaking from the chamber 76c in order to prevent the oil from entering into the Pitot pressure port 76a.

In the steady state, the spool 77 is at the left position by the Pitot pressure and the pressure of the pressure oil in the chamber 76c as shown in the drawing, so that the drain port 76d is closed. When the accelerator pedal is greatly depressed, the actuating member 80 is shifted to the right by the shift cam to shift the spool 77 to the right. Accordingly, the port 76b communicates with drain port 76d, so that piston 65 of FIG. 2 is moved to the right. Thus, a downshift takes place in the same manner as described above. The Pitot pressure rises as the speed of the primary pulley increases. When the Pitot pressure exceeds a predetermined value, spool 77 is shifted to the left to close the drain port 76d. Thus, the system returns to an ordinary state. The speed of the primary pulley 24 can be changed by selecting the compression force of spring 79, Pitot pressure, and the pressure receiving area of the spool 77.

From the foregoing it will be understood that the present invention provides a transmission ratio control system which produces a downshift regardless of the operation of a shift cam dependent on throttle position, thereby improving the acceleration characteristic in the entire driving range of the vehicle. Further, with the transmission using an electromagnetic clutch, the clutch can smoothly engage during deceleration after disengagement of the clutch.

What is claimed is:

1. In a system for controlling the transmission ratio of an infinitely variable transmission for a vehicle having a primary pulley having a hydraulically shiftable disc and a hydraulic cylinder for shifting the disc, a secondary pulley having a hydraulically shiftable disc and a hydraulic cylinder for operating the disc of the secondary pulley, a belt engaged with both pulleys, a hydraulic circuit having a pump for supplying pressurized oil, a transmission ratio control valve comprising a spool for shifting the disc of the primary pulley in a downshift direction and an upshift direction, respectively, and a pressure regulator valve for regulating the pressure of the oil, the system including shifting means for shifting the spool of the transmission ratio control valve in the upshift direction and in the downshift direction respectively in dependency on throttle position, the improvement comprising:
   first means for detecting a wide open throttle position and thereupon for producing a signal; and
   second means responsive to said signal for forcibly shifting for a time said spool of said transmission ratio control valve in the downshift direction from a position of said spool then determined by the shifting means so as to downshift the transmission further from said position.

2. The system according to claim 1 wherein said first means is a throttle switch adapted to be closed when a throttle valve of the vehicle is widely opened.

3. The system according to claim 1 wherein said second means comprises a solenoid operated valve responsive to said signal and a downshift valve operated in dependence on the operation of said solenoid operated valve.

4. In a system for controlling the transmission ratio of an infinitely variable transmission for a vehicle having a primary pulley having a hydraulically shiftable disc and a hydraulic cylinder for shifting the disc, a secondary pulley having a hydraulically shiftable disc and a hydraulic cylinder for operating the disc of the secondary pulley, a belt engaged with both pulleys, a hydraulic circuit having a pump for supplying pressurized oil, a transmission ratio control valve comprising a spool for shifting the disc of the primary pulley in a downshift direction and an upshift direction, respectively, and a pressure regulator valve for regulating the pressure of the oil, the system including shifting means for shifting the spool of the transmission ratio control valve in the upshift direction and in the downshift direction respectively in dependency on throttle position, the improvement comprising:

first means for detecting a wide open throttle position and thereupon for producing a signal;

second means responsive to said signal for forcibly shifting for a time said spool of said transmission ratio control valve in the downshift direction from a position of said spool determined by the shifting means so as to downshift the transmission, said first means comprises a shiftable spring biased drain valve, said second means includes a downshift valve operated in dependency on said shiftable drain valve, said downshift valve has a spring-biased piston with an engaging rod formed with a projection means for engaging and shifting a portion of said shifting means to provide said forcibly shifting of said spool.

5. The system according to claim 1, wherein said second means includes a timer means for setting said time to be a predetermined time.

6. The system according to claim 1, wherein said first means comprises a shiftable spring biased drain valve, and said second means includes a downshift valve operated in dependency on said shiftable drain valve.

7. In a system for controlling the transmission ratio of an infinitely variable transmission for a vehicle having a primary pulley having a hydraulically shiftable disc and a hydraulic cylinder for shifting the disc, a secondary pulley having a hydraulically shiftable disc and a hydraulic cylinder for operating the disc of the secondary pulley, a belt engaged with both pulleys, a hydraulic circuit having a pump for supplying pressurized oil, a transmission ratio control valve comprising a spool for shifting the disc of the primary pulley in a downshift direction and an upshift direction, respectively, and a pressure regulator valve for regulating the pressure of the oil, the system including shifting means for shifting the spool of the transmission ratio control valve in the upshift direction and in the downshift direction respectively in dependency on throttle position, the improvement comprising:

first means for detecting a wide open throttle position and thereupon for producing a signal;

second means responsive to said signal for forcibly shifting for a time said spool of said transmission ratio control valve in the downshift direction from a position of said spool determined by the shifting means so as to downshift the transmission, said first means comprises a shiftable spring biased drain valve, said second means includes a downshift valve operated in dependency on said shiftable drain valve, said drain valve is biased by Pitot pressure from said primary pulley in a direction against the spring biasing of said drain valve and in a direction toward terminating said signal.

8. The system according to claim 6, wherein said downshift valve is applied with drain oil from said hydraulic circuit.

9. The system according to claim 3, wherein said downshift valve is applied with drain oil from said hydraulic circuit.

10. In a system for controlling the transmission ratio of an infinitely variable transmission for a vehicle having a primary pulley having a hydraulically shiftable disc and a hydraulic cylinder for shifting the disc, a secondary pulley having a hydraulically shiftable disc and a hydraulic cylinder for operating the disc of the secondary pulley, a belt engaged with both pulleys, a hydraulic circuit having a pump for supplying pressurized oil, a transmission ratio control valve comprising a spool for shifting the disc of the primary pulley in a downshift direction and an upshift direction, respectively, and a pressure regulator valve for regulating the pressure of the oil, the system including shifting means for shifting the spool of the transmission ratio control valve in the upshift direction and in the downshift direction respectively in dependency on throttle position, the improvement comprising:

first means for detecting a wide open throttle position and thereupon for producing a signal;

second means responsive to said signal for forcibly shifting for a time said spool of said transmission ratio control valve in the downshift direction from a position of said spool determined by the shifting means so as to downshift the transmission, said second means comprises a solenoid operated valve responsive to said signal and a downshift valve operated in dependency on the operation of said solenoid operated valve, and said downshift valve has a spring-biased piston with an engaging rod formed with a projection means for engaging and shifting a portion of said shifting means to provide said forcibly shifting of said spool.

* * * * *